United States Patent [19]

Keeley

[11] Patent Number: 4,931,228

[45] Date of Patent: Jun. 5, 1990

[54] METHOD OF MANUFACTURING SOFT CONTACT LENS BUTTONS

[75] Inventor: Edward M. Keeley, Huntington Beach, Calif.

[73] Assignee: Coastvision, Huntington Beach, Calif.

[21] Appl. No.: 333,982

[22] Filed: Apr. 5, 1989

[51] Int. Cl.$^5$ .............................................. B29D 11/00
[52] U.S. Cl. .................................. 264/2.6; 264/1.1; 425/808
[58] Field of Search ............... 264/1.1, 2.1, 2.2, 2.6; 425/808

[56] References Cited

U.S. PATENT DOCUMENTS

| | | | |
|---|---|---|---|
| 3,038,210 | 6/1962 | Hungerford et al. | 18/58 |
| 3,220,960 | 11/1965 | Wichterle et al. | 260/2.5 |
| 3,503,942 | 3/1970 | Seiderman | 260/80.75 |
| 3,647,736 | 3/1972 | Ewell | 260/29.6 |
| 3,700,761 | 10/1972 | O'Driscoll | 264/1 |
| 3,728,315 | 4/1973 | Gustafson | 260/80.75 |
| 3,780,003 | 12/1973 | Seymour et al. | 260/86.1 |
| 3,816,571 | 6/1974 | O'Driscoll et al. | 264/1 |
| 3,819,782 | 6/1974 | Irie | 264/49 |
| 3,839,304 | 10/1974 | Hovey | 260/80.72 |
| 3,841,598 | 10/1974 | Grucza | 425/808 |
| 3,841,985 | 10/1974 | O'Driscoll et al. | 204/159.16 |
| 3,894,129 | 7/1975 | Hoffman et al. | 264/1 |
| 3,926,892 | 12/1975 | Holcombe, Jr. | 260/29.6 |
| 3,947,401 | 3/1976 | Stamberger | 260/29.6 |
| 3,965,063 | 6/1976 | Holcombe, Jr. | 260/29.6 |
| 3,985,697 | 10/1976 | Urbach | 260/29.6 |
| 3,988,274 | 10/1976 | Masuhara et al. | 260/29.7 |
| 3,992,563 | 11/1976 | Tanaka | 526/219 |
| 4,028,295 | 6/1977 | Loshack | 260/29.6 |
| 4,056,496 | 11/1977 | Mancini et al. | 260/29.6 |
| 4,123,408 | 10/1978 | Gordon | 260/29.6 |
| 4,127,638 | 11/1978 | Cuffe et al. | 264/331 |
| 4,132,518 | 1/1979 | Rips | 425/808 |
| 4,197,266 | 4/1980 | Clark et al. | 264/2.2 |
| 4,247,492 | 1/1981 | Neefe | 425/808 |
| 4,361,657 | 11/1982 | Atkinson | 523/106 |
| 4,378,953 | 4/1983 | Winn | 264/2.1 |
| 4,405,773 | 9/1983 | Loshaek | 526/317 |
| 4,419,463 | 12/1983 | Atkinson et al. | 523/106 |
| 4,465,794 | 8/1984 | Kuzma | 523/106 |
| 4,495,313 | 1/1985 | Larson | 523/106 |
| 4,529,747 | 7/1985 | Kato et al. | 523/108 |
| 4,559,186 | 12/1985 | Lee | 264/2.1 |
| 4,609,507 | 9/1986 | Wichterle et al. | 264/1.1 |
| 4,680,149 | 7/1987 | Rawlings | 264/2.1 |

FOREIGN PATENT DOCUMENTS 194817 11/1984 Japan ...................... 264/1.1

*Primary Examiner*—James Lowe
*Attorney, Agent, or Firm*—Fulwider, Patton, Lee & Utecht

[57] ABSTRACT

A method for manufacturing soft contact lens buttons includes the steps of providing a unique monomeric mixture and polymerizing the mixture in an open mold in a non-convecting environment. In one preferred embodiment the monomeric mixture includes purified 2-hydroxyethyl methacrylate and between about 0.015 to about 0.10% by weight diethylene glycol methacrylate. The polymerizing step includes a first heating at 70° C. for about one-and-one-half hours and a second heating at about 105° C. for about two hours. The mold is composed of material that softens at the temperatures it is subjected to during the polymerization process. The non-convecting environment allows longer polymerization times to be used without evaporating volatile components. Lower temperatures, and an open and deformable mold, reduces stresses the hardening button is subjected to, to yield a stronger and tear-resistant product.

7 Claims, No Drawings

METHOD OF MANUFACTURING SOFT CONTACT LENS BUTTONS

BACKGROUND OF THE INVENTION

1. Field of the Invention

This invention is generally related to the manufacture of contact lenses, and more specifically, to a new process for manufacturing "buttons" from which soft contact lenses having greater tear resistance can be produced.

2. Description of the Related Art

As is known in the art, contact lenses are frequently made of polymethyl methacrylate. Such lenses are known as "hard lenses". Many people have trouble adapting to the presence of a hard lens in their eye. Furthermore, these hard lenses often compromise the physiological processes required for corneal metabolism. For many, minor irritations may be caused by small particles that become lodged under the hard lens, resulting in the irritation of the cornea. Moreover, it is found that after wearing a hard lens for an extended time, e.g., from one to five years, many people experience chronic discomfort and are forced to discontinue its use.

In view of the above difficulties, "soft" or "hydrophilic" lenses were developed. Soft lenses are made of various hydrogel materials to reduce the irritation of the corneal surface. In addition, since these hydrophilic lenses are made of materials which have a higher water content, on the order of 50% to 65%, and tend to be physically thinner than the hard lenses, they tend to be more $O_2$ permeable, allowing the user to wear the contact lens for extended periods of time. One specific hydrogel formulation disclosed in the earlier patents includes a predominant quantity of 2-hydroxyethyl methacrylate. This hydrogel, known as "HEMA", is used for contact lenses, in part, because of its ability to absorb water of hydration, typically from about 35% to about 65% by weight. The water renders the lens flexible and soft, which enables it to mold to the curvature of the eye. Various formulations of hydrogels have been disclosed which achieve a particular expansion coefficient, maximize optical transparency and exhibit desired physical stability characteristics.

The hydrogel is commonly polymerized into the form of small circular buttons, which are subsequently ground to prescription while still in their hard, unhydrated state. While the copolymerization process inherently calls for elevated temperatures, it is high temperature for extended periods of time that can have an adverse effect on the resulting product by causing certain essential volatile components to evaporate from the formulation. In order to reduce this loss, two different approaches have been taken in the prior art. One method calls for reducing the time required for polymerization by subjecting the monomers in an open mold to an even higher temperature for a short period of time. Subjecting the hardening button to the augmented thermal stress associated with this technique, however, reduces the tensile strength or tear resistance of the resulting product. Alternatively, the prior art suggests using closed molds to contain the monomers, thus allowing lower temperatures to be applied for a longer period of time. Although this minimizes the evaporation of the volatile constituents, the hardening button is exposed to stresses and strains due to its constraint within the closed mold. Either method results in a button that is of reduced tensile strength. A subsequent annealing step, in which the polymerized button is subjected to elevated temperature serves to recoup some of the strength loss by relieving internal stress, but the ultimate product's tensile strength remains nonetheless compromised.

Hence, those concerned with the manufacture of hydrogels for use in soft contact lenses have long recognized the need for a method of making the same which provides a resulting end product which is more tear resistant. Furthermore, there is a need for a method of making soft contact lenses which reduces the stress applied or created within the buttons during the manufacturing process and, at the same time, reduce the evaporation of volatile constituents at the surface or interface of such buttons. The present invention clearly fulfills all of these needs.

SUMMARY OF THE INVENTION

Briefly, an in general terms, the present invention provides a novel method by which a hydrophilic contact lens button is manufactured which exhibits increased structural stability while being manufactured in a process which is considerably shorter than most conventional closed mold methods.

Basically, the present invention is directed to an improved manufacturing method which incorporates a composition which is more stable and provides the desired optical requirements. Furthermore, the manufacturing method includes a two-step polymerizing process, performed at lower temperatures. The polymerizing process takes place in an open mold in a non-convecting environment.

In a presently preferred embodiment of the invention, by way of example and not necessarily by way of limitation, the polymerizable monomeric mixture is purified to about 99.5% purity (via a distillation procedure having an efficiency of about ten theoretical plates) and includes diethylene glycolmethacrylate from about 0.015% to about 0.10% by weight of the mixture. The mixture is polymerized in an open mold in a non-convecting environment. The polymerizing step including a first heating step at about 70° C. for about one and one-half hours, and a second heating at about 105° C. for about two hours. The resulting button is then removed from the mold and annealed in a convection oven, at about 120° C. for about one hour. In addition, the mold in which the mixture polymerizes is composed of material that softens at the temperatures encountered during the polymerization procedure.

The non-convecting environment effectively reduces evaporization thus enabling polymerization to proceed for an extended period of time at a commensurately reduced temperature. The lower temperatures, in addition to the use of an open and softening mold configuration greatly reduces the stresses and strains the polymerizing button is subjected to, to yield a stronger tear-resistance end product.

These and other objects and advantages of the present invention will become apparent from the following more detailed description.

DETAILED DESCRIPTION OF THE INVENTION

The present invention is primarily concerned with methods by which a hydrogel is used in the making of soft contact lens such that the soft contact lenses exhibit increased tear resistance and thus allow a thinner and more gas permeable lens to be produced.

The present method embodying novel aspects of the present invention includes the distillation of the 2-hydroxyethyl methacrylate component and the formulation of a monomer mixture which includes a small amount of diethylene glycol methacrylate. Polymerization is accomplished by a two-step heating procedure performed in an open and softening mold within a non-convecting environment. This procedure is described in more detail below.

Example

The present method embodying novel aspects of the present invention includes providing various ingredients used to formulate the soft contact lenses. These ingredients include 2-hydroxyethyl methacrylate (HEMA); methacrylic acid (hereinafter referred to as "MA"); ethylene glycol dimethacrylate (hereinafter referred to as "EGDMA"); diethylene glycol methacrylate (hereinafter referred to as "DEGMA"); and 2, 5-dimethyl-2, 5-bis (2 ethyl hexoyl peroxy) hexane (hereinafter referred to as "USP 245").

In the preferred embodiment, the raw HEMA is selected for an initial MA content of less than or equal to 0.4%; EGDMA content of less than or equal to 0.5% and a DEGMA content of less than or equal to 0.5%. Gas chromatographic techniques may be used to determine the purity of the particular HEMA batch. A refractive index at 25° C. of about 1.4 to about 1.5 and most preferably between about 1.4500 to about 1.4520 is desired. HEMA may be purchased from Mitsubishi Rayon Co., Ltd. Plastics Division of Tokyo, Japan.

MA is another constituent in the novel formulation of the present invention. Initial inspection should reveal the raw material MA to be a clear liquid with no suspended matter and having an acrid odor. A particular batch should be checked by a gas chromatographic analysis. The acidity should be greater than or equal to 98%. A refractive index at 25° C. of about 1.4 to about 1.5 and most preferably between 1.4290 to about 1.4300 is desired. MA may be purchased from Mitsubishi Rayon Co., Ltd. Plastics Division of Tokyo, Japan.

EGDMA is the cross-linking agent for the polymerization of HEMA. Initial inspection of the EGDMA should reveal the raw material to be clear and colorless. The particular batch should be checked by gas chromatographic analysis for purity. A refractive index at 25° C. of about 1.45 and most preferably between about 1.4529 to about 1.4538, is desired. EGDMA may be purchased from Mitsubishi Rayon Co., Ltd. Plastics Division of Tokyo, Japan.

DEGMA has a specific water absorbing property for the hydrogel polymer of HEMA. A refractive index at 25° C. of about 1.4 to about 1.5 and, most preferably about 1.4559 is desired. DEGMA may be purchased from Monomer Polymer Labs Inc. of Trevose, Pa.

DPBQ generally inhibits the polymerization of HEMA. The initial inspection should reveal the raw material to be a fine, brown powder. The DPBQ to be used should have a melting point between about 205° to about 215° C., and most preferably between about 206 179 to about 210 179. The particular DPBQ may be purchased from Eastman Kodak Company of Rochester, N.Y.

USP-245 (2, 5-Dimethyl-2, 5-bis(2-ethylhexanoyl-peroxy) hexane (Peroxyester)) is a clear, colorless liquid for initiating the polymerization reaction of HEMA. A refractive index at 25° C. of about 1.45 and most preferably about 1.4495 to about 1.4520 is desired. The particular USP-245 may be purchased from Witco Chemical Corporation of Richmond, Calif.

After the selection of the raw materials, the raw HEMA is distilled. The distillation procedure may be started for convenience in the afternoon and allowed to run over night. The distillation equipment conforms to the general practice for vacuum distillation. The still is equipped with a magnetic stirrer, a temperature controller and a vacuum control apparatus. Preferably, the condenser provides efficiency equivalent to about ten theoretical plates. A top heating means is connected to the mantel. A chiller is connected to the condenser to condense the vaporized HEMA which is collected in a reservoir. The temperature controller is attached to the heating mantel and to the condenser.

In one preferred method, 3.0 liters of HEMA obtained from the acceptable batch of raw materials is placed within the distillation flask. The sample to be distilled is heated and stirred during this step. The top heating mantel is adjusted to attain a temperature of about 74° C. Upon reaching the desired temperature, about 0.7 grams of DPBQ is quickly added to the flask. An additional 0.7 liters of HEMA is added to wash through any residual DPBQ in to the reservoir. The system is closed and heat is continually applied until the sample reaches about 40° C. A vacuum is slowly applied until a pressure of about 0.1 to about 0.5 torr is reached.

Upon achieving the desired vacuum, the chiller is turned on. The heating is continued until a pot temperature of about 72° C. to about 73° C. is reached. The head temperature should equilibrate between 50° C. and 61° C. when the rate of distillation is continuous at about two drops per second. This temperature span should be maintained once the distillation has begun.

The first 100 ml of distillation effluent is discarded. A sufficiently large receptacle, e.g., a five liter flask, is then placed into position to collect the remainder of the distillate product. The collection flask must be shielded from the light. If the room is not dark, the flask should be wrapped with an appropriate material, e.g., aluminum foil. Once the distillation has begun, the head temperature should be monitored periodically to maintain the desired temperature limits. The pot temperature setting may be adjusted to maintain a constant rate of distillation, which may tend to slow during the course of distillation. The setting should not exceed 78° C. The distillation continues until about three liters has been collected. Two or more distillation runs are generally needed for each production run of buttons. The purified HEMA is placed into containers and refrigerated at about 5° C. pending further processing. The maximum recommended shelf life is about three weeks.

The distilled HEMA is then analyzed by gas chromatographic techniques for purity (e.g., about 99.5%) before it can be mixed with the other ingredients. The most mature HEMA stored will usually be used and allowed to equilibrate at room temperature, e.g., for about one hour. This distilled HEMA sample is then placed into a large container with a stir bar. Enough freshly distilled HEMA is added to the initial HEMA aliquot to give a total desired weight. The flask is placed onto the stirring platform. The contents are mixed thoroughly for a minimum of about thirty minutes. After mixing, a one milliliter (ml) aliquot from the flask is removed for gas chromatographic analysis to determine the purity of the HEMA for formulation calculations.

The most preferred composition should include about 1.895% MA; about 0.28% EGDMA, between about 0.015% to about 0.10% DEGMA; and the balance HEMA. In this present example, the exact formulation of each batch is based on the gas chromatography findings. First, the amount of HEMA (in grams) of the final HEMA mixture is determined by dividing the starting amount (in grams) of HEMA by the percent HEMA determined by gas chromatography. The percent MA found in the purified HEMA is then subtracted from 1.895. This is the percentage of MA to be added to the mixture and is multiplied by the weight (in grams) of the final HEMA mixture to obtain the grams of the MA to be added. The percent EGDMA found in the purified HEMA is subtracted from 0.28. This is the percent of EGDMA to be added to the mixture and is multiplied by the amount (in grams) of the final HEMA mixture to obtain the amount of the EGDMA (in grams) to add. The DEGMA in the purified HEMA should fall between 0.0015% to about 0.10%. If the DEGMA concentration is below this, the percent DEGMA found in the purified HEMA is subtracted from 0.015%. This provides the percent DEGMA needed to bring it up to the minimum amount which is then multiplied by the molecular weight of DEGMA to yield the weight in grams of DEGMA in the final HEMA mixture to obtain the grams of the DEGMA to be added.

As the HEMA sample is stirring, after the determination of the appropriate amounts, the appropriate amounts of MA, EGDMA and DEGMA are added to the HEMA. The mixture is allowed to stir for a minimum of one hour. After the contents have been mixed, they may be placed in refrigeration, e.g., at about 5° C., pending further processing.

When the actual production of the buttons is to be performed, the monomer mixture in the flask is removed from the refrigerator and is allowed to come to room temperature for about one hour. Means for stirring the compound is provided. For example, a stir bar may be placed within the container. USP-245 is allowed to come to room temperature for about twenty minutes. The amount of USP-245 needed is calculated by multiplying 0.082 percent by the weight (in grams) of the final HEMA mixture. Add the USP-245 to the monomer mixture and mix for a minimum of one hour.

The polymerization is performed in an open mold within a "non-convecting" environment to reduce the stresses applied to the buttons during this stage. The fact that the mold is open and softens upon heating allows the hardening button to undergo expansion without stress, while the non-convecting environment reduces evaporation thereby enabling lower temperatures (for reduced thermal stress) to be applied for longer periods of time. In the preferred method, the polymerizing oven is heated to about 66° C. Working under a vented hood, about 1.2 ml of monomer mixture is dispensed with a Wheaton bottle filler into each mold arranged on a heating tray. Polyethylene molds are preferred and are made by Clusteroid of Allenwood, N.J. The tray of filled molds is covered with a second tray that gives a close but not sealed fit. For example, a planar aluminum tray sized to fit over the tray of filled molds may be inverted and placed directly over the molds to deflect the heated air flow off the polymerizing mixture and reduce the effect of heated horizontal air flow impinging upon the monomer mixture as it polymerizes. The trays are placed in the oven and heated. After about fifty minutes the thermocouples are turned on to monitor the exotherm. If the exotherm exceeds 73° C., the temperature is adjusted by appropriate means to maintain the temperature below 73° C. For example, the intake vents to the particular oven used may be opened or closed accordingly. During this time the polyethylene molds melt or deform slightly thereby relieving any stresses that may have built up within the polymerizing buttons. After approximately ninety minutes of heating, the temperature is increased to about 105° C. to cure the HEMA blanks for about two hours.

After the polymerization has been completed, the buttons are annealed. For example, the trays may be removed from the oven and the buttons released from the molds with simply a twisting action. The deformation the molds had undergone eases the removal of the buttons obviating the need to machine punch the individual buttons from the mold. This further serves to reduce the stresses the buttons would otherwise be subjected to. The buttons are then placed on a Teflon coated tray. The oven temperature is then raised to about 120° C. and the buttons are returned to the oven to anneal for about one hour. After about one hour, the oven is turned off but the door is not opened. The buttons are allowed to cool slowly in the closed oven for about one-and-one-half to about two hours. The cooled buttons are then stored in a container with desiccant packets.

The buttons are then selectively tested for final acceptance testing to make ensure that the particular buttons meet suitable standards for light transmittance, $O_2$ permeability, water content, tensile strength, and elasticity. For example, the buttons manufactured in accordance with the present invention are inspected for a clear, colorless transparent appearance. The hardness of the individual buttons should exhibit hardness characteristics greater than or equal to 88 on the Rockwell D-Scale. Linear expansion of the buttons in saline should be about 36%. Linear expansion of the buttons in de-ionized water should be about 17 to about 22%. The buttons should exhibit a base curve between about 2.2 to about 2.4 and most preferably about 2.218 to about 2.317. The buttons should exhibit optical characteristics such as light transmittance of greater than or equal to about 98%; a Water content averaging between about 50% to 65%, and most preferably about 55.5%; and a refractive index of about 1.3 to about 1.5, and most preferably between about 1.400 to about 1.4120. The buttons should exhibit a tensile strength greater than or equal to about 7-8 kg/cm$^2$; and elasticity of about 1-6 kg/cm$^2$.

Indeed, buttons manufactured in accordance with the method of the present invention exhibit improved physical and mechanical characteristics. For example, elasticity is expressed as the ratio of the strength of the polymer to the stretch; therefore, a smaller number means that given the same amount of force, the lens will stretch further. A difference in elasticity of about 17% in lenses made by the present process over soft contact lenses made by conventional processes will result in a lens that is substantially more durable. The tensile strength of a polymer is expressed in terms of the kilograms of force needed to break the lens. The polymer mixture embodying the aspects of the present invention withstood an average of 1.4 kg/cm$^2$ more force before breaking as compared to the prior conventional polymers. This value is demonstrative of a lens that is more tear resistant. The elongation at break is also significantly different for the buttons made in accordance with the concepts of the present invention. These lenses stretched an average of about 0.5 cm more before breaking. This is an increase of 29% in the elongation at break and similarly seems to be indicative of greater tear resistance.

In conclusion, the mechanical properties evaluation reveals a significant difference between the buttons made from the differing methods. As a result the lenses manufactured in accordance with the method embodying the present invention will be stronger, more durable, and more resistant to tearing and will, therefore, hold up better to the patient's handling.

The lenses manufactured in accordance with the method embodying the present invention may be tested for attaining the desired standards. For example, a test lens was swollen in a standard hydrating solution to an equilibrium state prior to the use of a test piece. The test lens was allowed to equilibrate in normal buffered saline solution, e.g., for at least fifteen minutes before subjection to the following various tests.

Visual Inspection The hydrated power of each test lens was measured and the exterior surface of the lens was visually inspected with a 7X loupe or at 10X with an optical comparator for any surface aberrations.

Physical dimensions with regards to the diameter of the individual test lenses were taken with a panametric. Base curve parameters and actual diameters both in saline and de-ionized water were taken. These are then compared with standards desired by the manufacturer.

Light Transmittance The transmittance of light may be determined by subjecting the test lens to a beam of light from a spectrophotometer, e.g., at about 538 nanometers.

Water Content The water content should be between about 53% to about 58%. This can be performed with a refractometer.

Oxygen Permeability $O_2$ permeability may be determined by a thermally equilibrated permeometer. After measuring the center thickness of one lens with a wet center thickness gauge, permeability can be calculated.

Mechanical Properties The lens is cut to give the lens a narrow center section. The center thickness is determined with a wet center thickness gauge. After zeroing an insertion of the lens into a lens gripper, a peak force value and elongation distance is determined. Tensile strength of the individual test lens is then ascertained by:

$$\frac{\text{peak force value (in Kg)}}{\text{area of cross-section (in cm}^2\text{)}}$$

The strain withstood by the test button can be determined by:

$$\frac{L_1}{L_0}$$

Where $L_0$ is the initial length of the button and $L_1$ is the elongation at the break. The elasticity can be determined from the following:

$$\frac{F/A}{(L_1)/L_0}$$

Where F is equal to the peak force value and A is equal to the area of the lens.

It will be appreciated from the foregoing that the present invention represents a significant advance in the field of hydrogel or soft contact lens manufacturing. In particular, the present invention provides a soft contact lens which exhibits increased tear resistance and visual clarity. It will also be appreciated that, although presently preferred embodiments of the invention have been described by way of example, various modifications may be made without departing from the spirit or scope of the invention. Accordingly, the present invention is not to be limited except as by the appended claims.

What is claimed is:

1. A process for manufacturing hydrophilic contact lens buttons, comprising the steps of:
    dispensing a polymerizable monomeric mixture into molds;
    loosely covering said molds so as to substantially limit convective air movement directly above said molds, yet prevent pressure build-up therein;
    heating said covered, mixture-containing molds to a preselected temperature for a preselected period of time sufficient to facilitate polymerization of said mixture;
    removing said polymerized mixture from said molds; and
    annealing the polymerized mixture whereby a strong tear resistant contact lens button results.

2. A process for manufacturing hydrophilic contact lens buttons as set forth in claim 1, wherein said polymerizable substrate includes Diethyleneglycolmethacrylate.

3. A process for manufacturing hydrophilic contact lens buttons as set forth in claim 2, wherein said Diethyleneglycolmethacrylate comprises between 0.015% to about 0.10% weight of said monomeric mixture.

4. A process for manufacturing hydrophilic contact lens buttons as set forth in claim 3, further including 2-hydroxy ethyl methacrylate purified to about 99.5% pure.

5. A process for manufacturing hydrophilic contact lens buttons as set forth in claim 1, wherein said covered mixture-containing molds are first heated to 70° C. for 1½ hours followed by further heating to 105° C. for 2 hours.

6. A process for manufacturing hydrophilic contact lens buttons as set forth in claim 5, wherein said annealing step includes heating the polymerized mixture in a convection oven at 120° C. for one hour.

7. A process for manufacturing hydrophilic contact lens buttons as set forth in claim 1 wherein said mold is comprised of material that softens upon reaching said preselected temperature.

* * * * *